(No Model.)
E. F. PFLUEGER.
TROLLING SPOON.
No. 501,436.  Patented July 11, 1893.
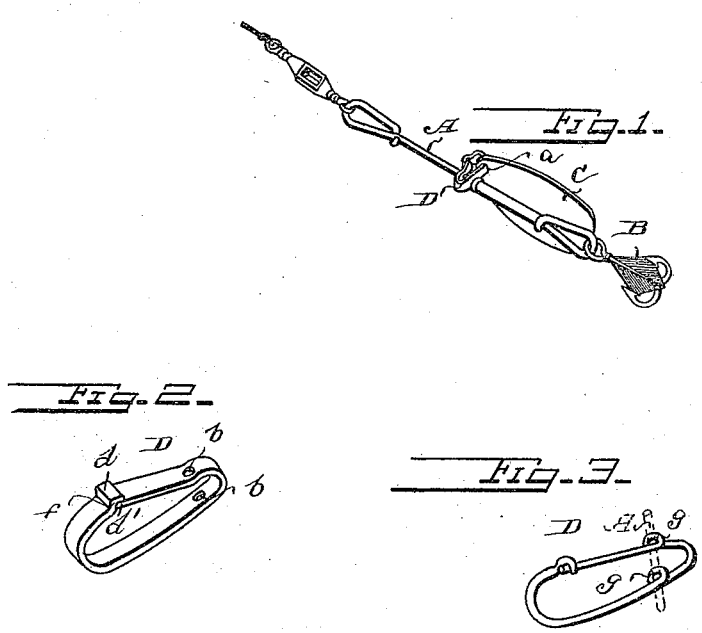
WITNESSES
Jesse Heller.
Phill C. Mass.
INVENTOR
E. F. Pflueger
by E. W. Anderson
his Attorney

United States Patent Office.

ERNEST FREDERICK PFLUEGER, OF AKRON, OHIO.

TROLLING-SPOON.

SPECIFICATION forming part of Letters Patent No. 501,436, dated July 11, 1893.

Application filed March 11, 1893. Serial No. 465,556. (No model.)

*To all whom it may concern:*

Be it known that I, ERNEST FREDERICK PFLUEGER, a citizen of the United States, and a resident of Akron, in the county of Summit and State of Ohio, have invented certain new and useful Improvements in Trolling-Spoons; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of a rod and spoon with attachment applied. Fig. 2 is a perspective view of the attachment device, and Fig. 3 is a perspective view of the device made from wire.

This invention has relation to certain new and useful improvements in trolling spoon attachments, the object being to provide simple and improved means for detachably attaching trolling spoons to the wire, rod, gimp, gut rod, or snood used in trolling; and the invention consists in the novel construction and combination of parts, all as hereinafter described and pointed out in the claims.

In the accompanying drawings, the letter A designates a rod or snood, which may be of any suitable style or character, as may also be the hook and bait B.

C designates the spoon, which may also be of any approved form, and which at its upper end, is provided with an eye or aperture $a$.

D designates the improved attachment device, which consists of a small piece of metal of spring character, bent to form a closed loop. The exact form of this loop is not considered essential, but a very practical form is that shown in the drawings, which is somewhat of an elongated oval, contracted at one end to a greater extent than at the other. The arms of this contracted portion of the loop are each pierced vertically to form small apertures $b$, and through these apertures is loosely passed the rod or snood A. The meeting ends of the loop are designed to bear against each other somewhat after the manner of the two members of an ordinary snap hook, the end $d$ forming the point of the hook, and the end $d'$, the tongue. For this purpose, the end $d$ is caused to overlap the end $d'$, and the overlapped portion is bent outwardly and downwardly as seen at $f$, to form a more substantial catch or bearing for the tongue $d'$. By means of this device, it will be observed that while the spoon will normally hang downwardly toward the hook or hooks, or at a downward angle to the rod, in the usual manner, yet it will be free to fall back away from the bait and hook, allowing the fish free play without danger of injury to the attaching device or to the spoon; also, that the spoon is capable of a free rotary movement around the rod. Furthermore, the spoon or bait may be quickly detached by means of the spring tongue, and another form or style quickly substituted, an advantage which will be appreciated by those familiar with this form of fishing.

In Fig. 3 I have shown the device as formed from a piece of wire, bent to form the loop. Small loops $g$ are also formed for engagement with the rod, said loops corresponding to the apertures $b$ in the form first described.

It is also obvious that the device may be used to advantage for attaching other forms of bait, as well as spoons.

Having described this invention, what I claim, and desire to secure by Letters Patent, is—

1. A detachable device for attaching trolling spoons or other bait to a bait carrying rod or similar device, said detachable device comprising a piece of metal bent to form a loop designed to engage both the spoon and the rod, one of the end portions of said loop forming a spring tongue, held in closing position by its own elasticity substantially as specified.

2. A detachable device for attaching trolling spoons or other bait to their carrying device, said detachable device comprising a loop having a bearing at one portion designed to receive the bait-carrying device, and at the opposite portion designed to engage the spoon or other bait, one of the end portions of said loop forming a spring tongue, held in closing position by its own elasticity substantially as specified.

3. The combination with a trolling spoon, or other bait, having an eye or aperture, of a detachable device for connecting said spoon or bait to its carrying rod or snood, said device comprising a piece of metal bent to form a loop, and designed to engage said eye or aperture, bearings in said loop for engagement with the rod or snood, one end portion of said loop forming a spring tongue, arranged to close the loop and held in closing position by its own elasticity substantially as specified.

In testimony whereof I affix my signature in presence of two witnesses.

ERNEST FREDERICK PFLUEGER.

Witnesses:
T. W. WAKEMAN,
G. C. A. GALL.